April 19, 1938. J. F. CULLIN 2,114,287
MACHINE FOR WINDING ARMATURE COILS
Filed Dec. 28, 1936 9 Sheets-Sheet 1

April 19, 1938.   J. F. CULLIN   2,114,287
MACHINE FOR WINDING ARMATURE COILS
Filed Dec. 28, 1936   9 Sheets-Sheet 2

Inventor:
Jasper F. Cullin
By Fred Gerlach
his Atty.

April 19, 1938.   J. F. CULLIN   2,114,287
MACHINE FOR WINDING ARMATURE COILS
Filed Dec. 28, 1936   9 Sheets-Sheet 3
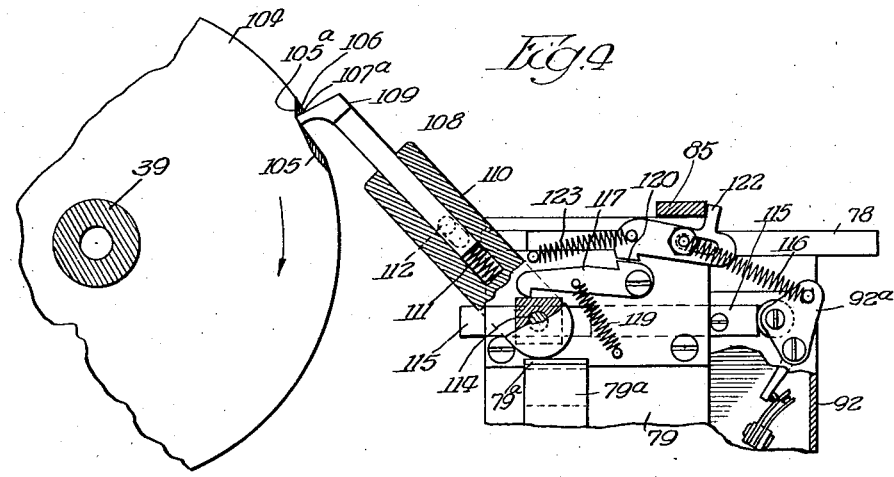
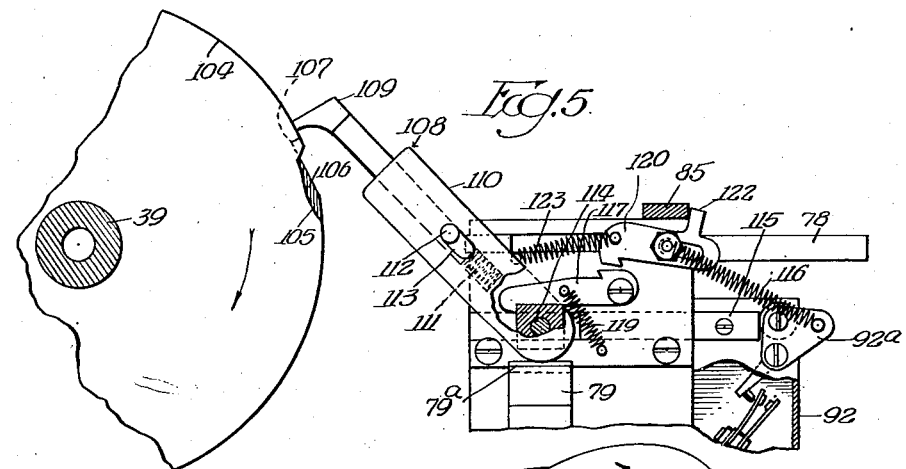
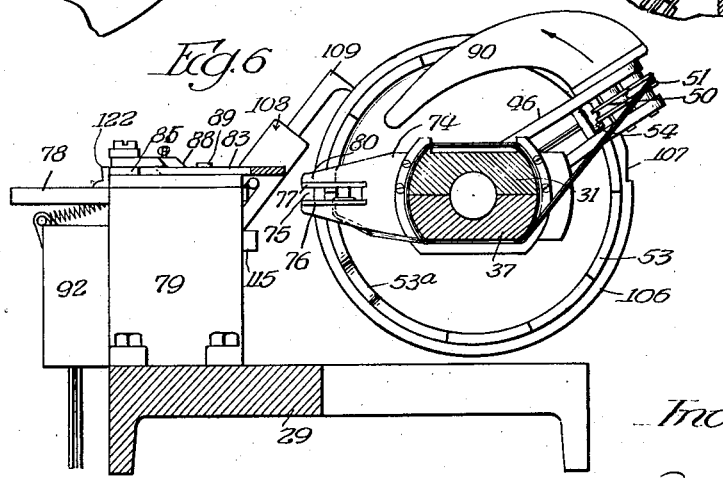

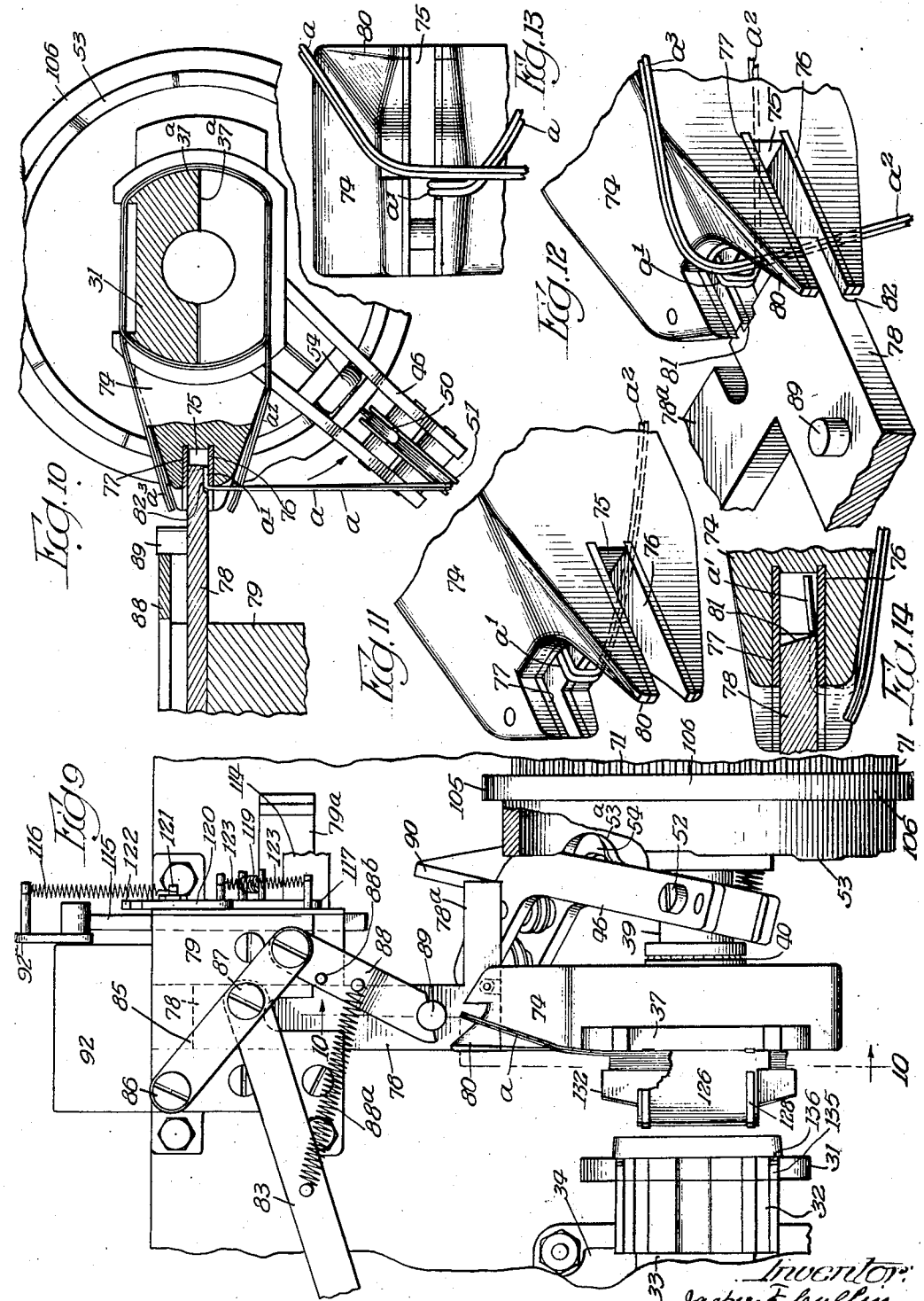

April 19, 1938.    J. F. CULLIN    2,114,287
MACHINE FOR WINDING ARMATURE COILS
Filed Dec. 28, 1936    9 Sheets-Sheet 6
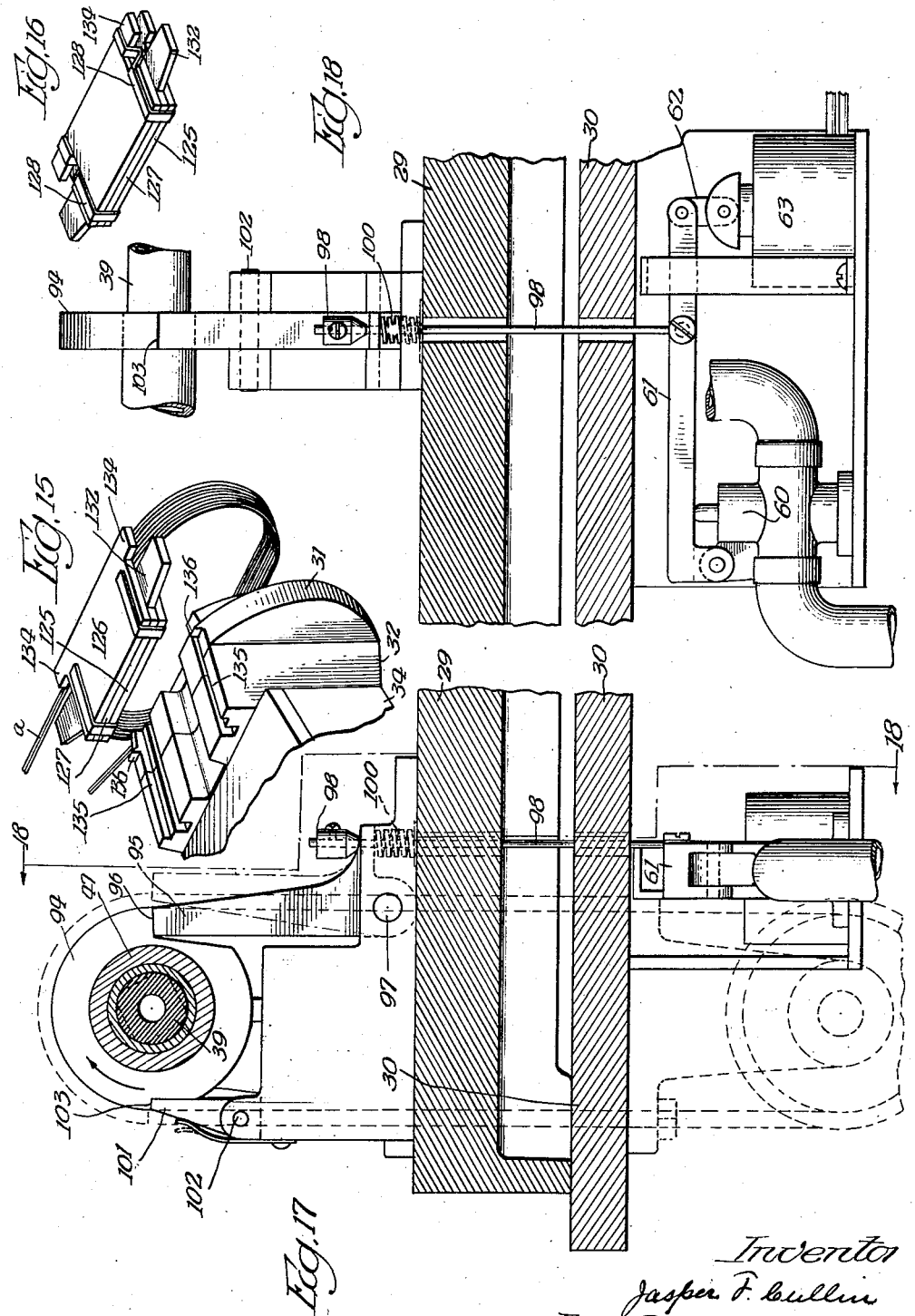

April 19, 1938.  J. F. CULLIN  2,114,287
MACHINE FOR WINDING ARMATURE COILS
Filed Dec. 28, 1936  9 Sheets-Sheet 7
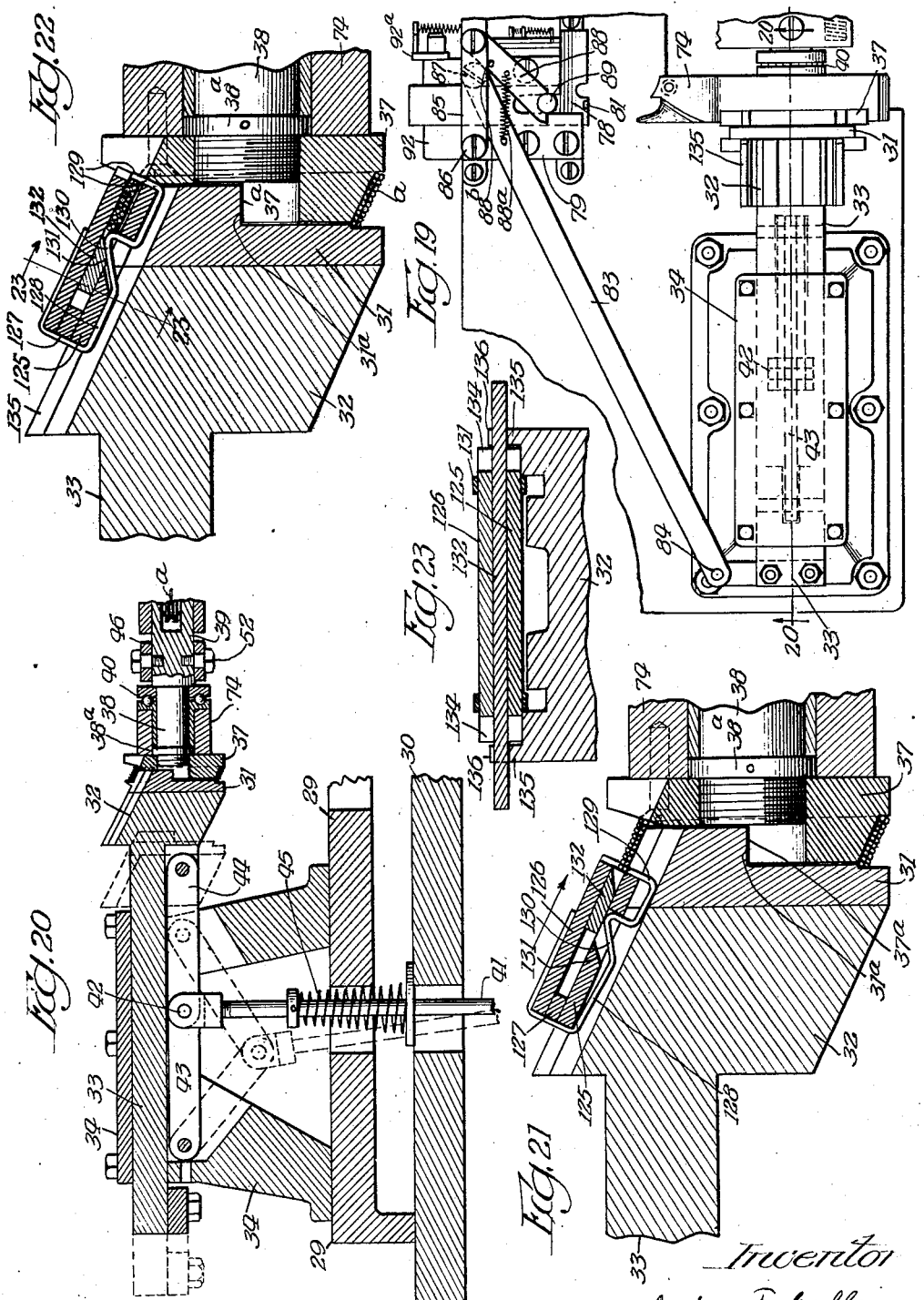
Inventor
Jasper F. Cullin
By Fred Gerlach, Atty April 19, 1938.    J. F. CULLIN    2,114,287
MACHINE FOR WINDING ARMATURE COILS
Filed Dec. 28, 1936    9 Sheets-Sheet 8
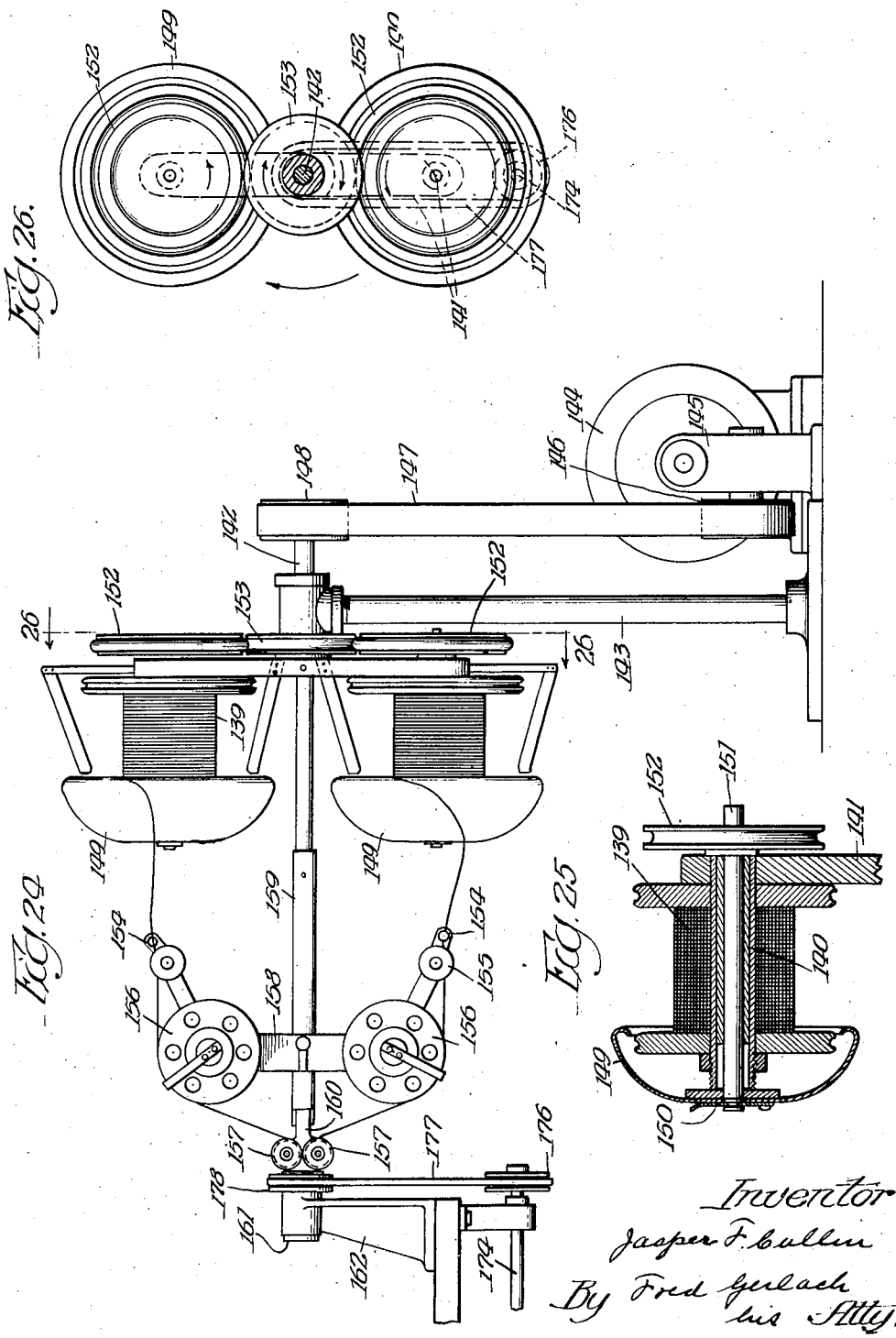

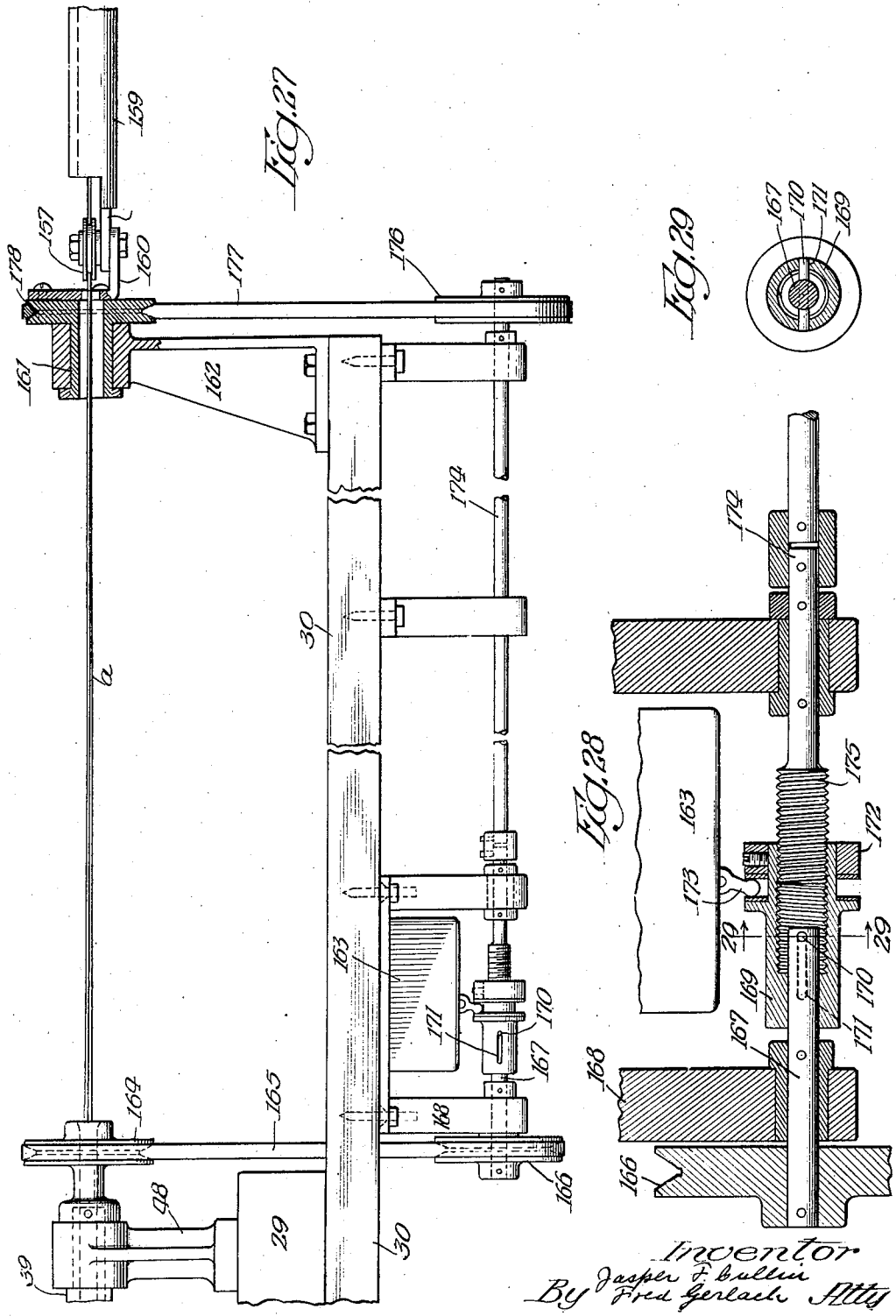

Patented Apr. 19, 1938

2,114,287

UNITED STATES PATENT OFFICE 2,114,287

MACHINE FOR WINDING ARMATURE COILS

Jasper F. Cullin, Detroit, Mich., assignor of one-third to Meyer B. Mervis and one-third to Lou Mervis, both of Chicago, Ill.

Application December 28, 1936, Serial No. 117,762

26 Claims. (Cl. 140—92.2)

The invention relates to machines for producing form-wound coils which are adapted to be inserted into the core of armatures.

The objects of the invention are to provide an improved coil-winding mechanism embodying: a stationary form and a winding-arm which revolves around and winds the wire on the form; clips or devices adapted to engage the wound coil while on its form and to hold the convolutions together for transfer from the winding machine to the armature core and which can be used to hold the coils while they are being assembled with the armature core; mechanism for synchronizing the dereeling device for feeding wire with the winding machine; improved shearing means for the ends of each coil; readily interchangeable mechanism for controlling the winding-arm for use of different gauges and coils of different numbers of convolutions of wire; automatic stop means for the winding mechanism when the coil has been wound; improved starting means for the winding mechanism; and other objects which will be apparent from the detailed description.

The invention consists in the several novel features which are hereinafter set forth and are more particularly defined by claims at the conclusion thereof.

In the drawings:

Fig. 4 is a side elevation of the mechanism for controlling the electrical switch which controls the starting and stopping of the motor for driving the winding mechanism, the parts being illustrated in position assumed near the completion of a coil-winding operation and immediately preceding the opening of the switch to stop the winding mechanism.

Fig. 5 is a similar view illustrating the parts after the switch has been opened and the winding mechanism has been automatically stopped.

Fig. 6 is a vertical section taken on line 6—6 of Fig. 1.

Fig. 9 is a plan of the winding mechanism after a coil has been wound around the form and the wire-shearing mechanism in its operative position.

Fig. 10 is a section on line 10—10 of Fig. 9.

Fig. 11 is a perspective of the shearing-head or anvil illustrating the manner in which the leading ends of the wires are secured therein after the previously wound coil has been removed.

Fig. 12 is a perspective of the shearing-head and the cutter illustrating the manner in which the wire is looped around the head preparatory to the operation of the cutter-blade to shear the wires of the completely wound coil from the wires leading from the winding-arm.

Fig. 13 is a front elevation of the shearing head with the extended ends of the coil laid therein preparatory to a shearing operation.

Fig. 14 is a section through the shearing-head and cutter illustrating the manner of shearing the ends of the wire of a coil which are hooked to the shearing-head after the coil has been wound.

Fig. 15 is a perspective of one of the form-sections around which the coil is wound, illustrating the manner of removing the wound coil therefrom.

Fig. 16 is an inverted perspective of the clip for retaining the wound coil in assembled relation while the coil is being transferred to and inserted in an armature.

Fig. 17 is a section taken on line 17—17 of Fig. 1, illustrating the latch-mechanism for locking the winding mechanism in its predetermined idle position.

Fig. 18 is a section on line 18—18 of Fig. 17.

Fig. 19 is a plan of the form for the coil and the shearing mechanism.

Fig. 20 is a section on line 20—20 of Fig. 19.

Fig. 21 is a section through the form for the coil and the clip for holding the coil assembled on the movable form-section being slipped into position to grasp the coil.

Fig. 22 is a similar view illustrating the clip after it has grasped the coil.

Fig. 23 is a section on line 23—23 of Fig. 22.

Fig. 24 is a side elevation of the dereeling mechanism.

Fig. 25 is a longitudinal section through the holder for one of the reels of wire.

Fig. 26 is a section on line 26—26 of Fig. 24.

Fig. 27 is an elevation of the mechanism for controlling the operation of the dereeling mechanism from the winding mechanism.

Fig. 28 is a longitudinal section of the mechanism for controlling the switch for the motor for driving the dereeling device.

Fig. 29 is a section on line 29—29 of Fig. 28.

Figure 1:
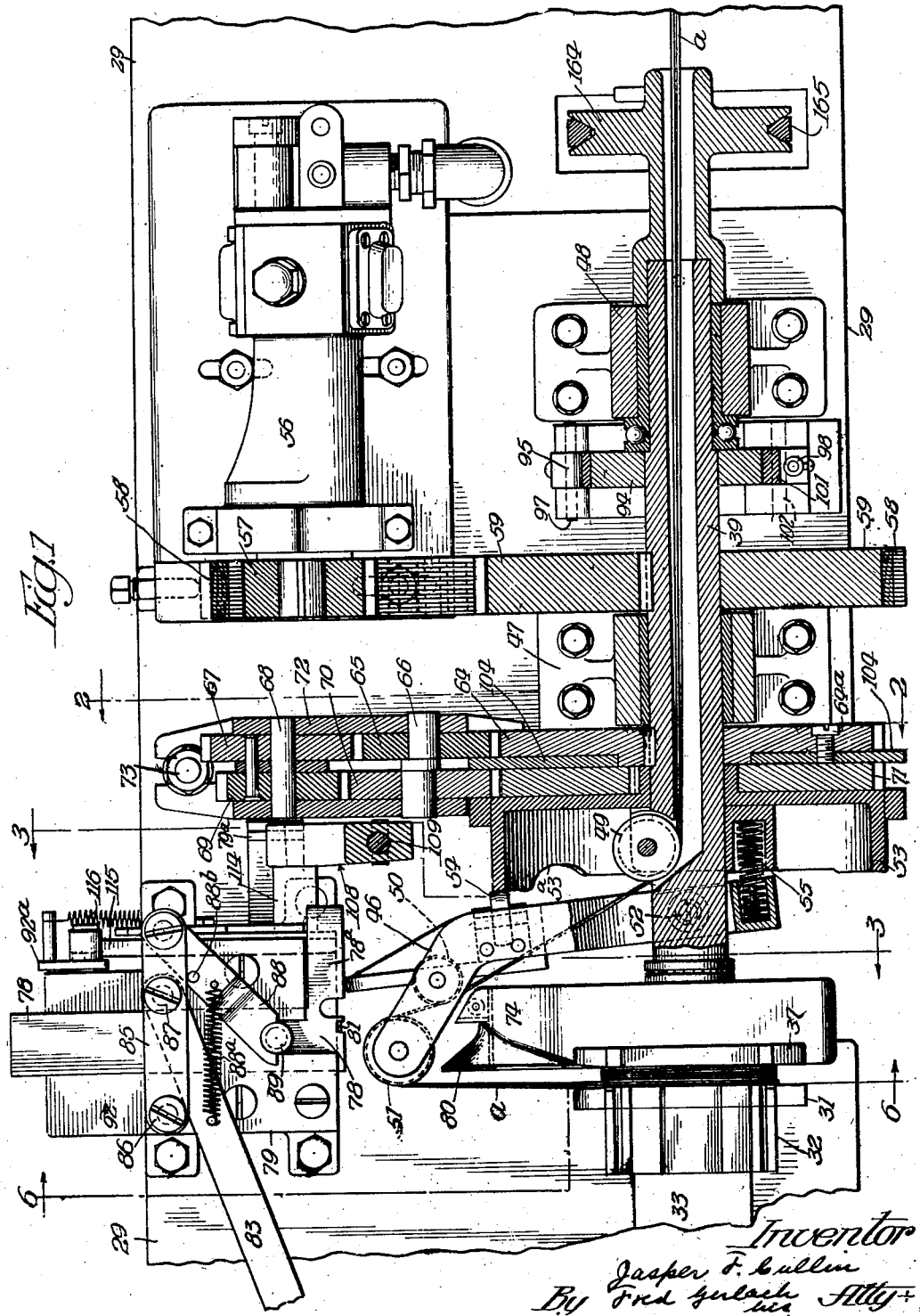
Fig. 1 is a plan of a portion of the winding mechanism, parts being shown in section.

The machine exemplifying the invention comprises a stationary form of the desired shape around which a pair of wires are parallelly wound, the form being formed of separable sections, so the finished coil can be removed; a rotatable winding-arm for wrapping the wire drawn from supply reels around the form; mechanism for automatically stopping the winding-arm upon the completion of the winding of a coil; cutting mechanism comprising a head or anvil, around which the winding-arm places the wire from the wound coil and a cutter-blade adapted to shear the wire between the wound coil and the winding-arm and for securing in the cutter-head the sheared end leading from the winding-arm, so it will be held therein during the succeeding winding operation; devices for automatically starting the mechanism for driving the winding-arm when the form-sections are brought together; mechanism for dereeling the wire passing to the winding-arm from the supply reels; and mechanism for controlling the dereeling mechanism in accordance with the winding operations.

The coil-winding and associated mechanisms are mounted on a bed 29 which is supported on a table 30. A sectional form has a contour corresponding to the shape in which the armature-coil is to be wound, usually with straight, parallel sides and semicircular ends (Fig. 6). This form comprises separable and mating sections 31 and 37 (Figs. 20-22). Section 31 is fixed to a head 32 which is fixed to a tail-stock 33 which is slidable longitudinally in a bracket 34 fixedly mounted on bed 29. Form-section 37 is stationarily supported on a spindle 38 on the inner end of a hollow drive-shaft 39 which drives the winding-head. Form-sections 31 and 37 have transverse shoulders 31ª, 37ª (Figs. 10, 21, 22) which engage each other so that the section 37 which is supported on shaft 39 will be locked to section 31 against rotation. A cutter-head 74 is fixedly secured to form-section 37. A collar 38ª (Figs. 21, 22) is screw-threaded to the end-portion of the spindle 38 to hold the non-rotatable head 74 and form-section 37 which are secured together, on the shaft 39. An antifriction thrust-bearing is provided between the shaft 39 and the head 74. The head 32, to which is fixed the form-section 31, is slidable with the tail-stock 33 so it can be separated from form-section 37 to permit the coil, after it has been wound on the form to be removed. The cutter-head and form-section 37, when the form-sections are separated, are held against rotation by the cutter-blade, as hereinafter set forth. The tail-stock 33 and form-section 31 are manually shiftable for opening the form by means of mechanism comprising a vertically movable rod 41 (Fig. 20) the upper end of which is pivoted at 42 to a pair of toggle-links 43 and 44. Link 43 is pivoted to bracket 34 and link 44 is pivoted to the tail-stock 33. A spring 45 is applied to rod 41, to normally hold the links in their extended position and lock the tail-stock 33 and head 32 in their operative position. A pedal or any suitable lever (not shown) is applied in any suitable manner to rod 41 for its convenient manipulation by the operator. When the rod 41 has been lowered by the operator, the tail-stock 33, head 32 and form-section 31 will be in the position indicated by dotted lines in Fig. 20 so that the coil of wire can be slipped off both of the form-sections and removed through the gap between them. The form-sections 31 and 37 are removably secured to heads 32, 74, respectively, so that form-sections of different contour may be used. This construction exemplifies a non-rotatable form, around which the wire is wound to form a coil, which is composed of separable sections for permitting the removal of the wound coils.

The mechanism for winding the wires around the form comprises a rotatable winding-arm 46 which is fixed to revolve with the shaft 39. This shaft is journaled in bearings 47 and 48 on the bed 29. The wires to be wound on the form pass through the bore of hollow shaft 39, around a roller 49 which is carried by the shaft; thence around a guide-roller 50 carried by arm 46; and thence around a roller 51 mounted in the distal and offset end of arm 46, from which it passes to the form 31, 37. The arm 46 forms a loop in the wire between the shaft 39 and the form, which extends around the cutter-head 74. Arm 46 is pivotally mounted at 52 on shaft 39 to swing longitudinally of the shaft to place the successive convolutions of the wire evenly on the form and to lay the wire in the cutter-head at the completion of a winding operation. The longitudinal pivotal movement of arm 46 is controlled by a rotatable cam 53 which engages a roller on arm 46 and is provided with suitable steps for swinging the arm back and forth across the width of the coil and a notch 53ª for controlling the said arm to lap the wire around the head 74. A spring 55 (Fig. 1) is applied to the arm to hold a roller 54 on the arm in contact with cam 53. During the winding of the wire on the form, arm 46 and cam 53 will be rotated at different speeds for relative rotation, to impart the desired longitudinal movement of the arm, by mechanism hereinafter described.

The mechanism for driving shaft 39 comprises a rotary motor 56 which is operable by fluid under pressure, a sprocket-pinion 57 fixed to rotate with the shaft of said motor, a chain 58 driven by said sprocket and a sprocket-wheel 59 keyed to shaft 39. The operation of motor 56 is controlled by a throttle-valve 60 (Fig. 18) which is controlled by a lever 61 which is connected by a link 62 to the armature of a solenoid-magnet 63. This magnet is automatically controlled by means hereinafter set forth.

Figure 2:
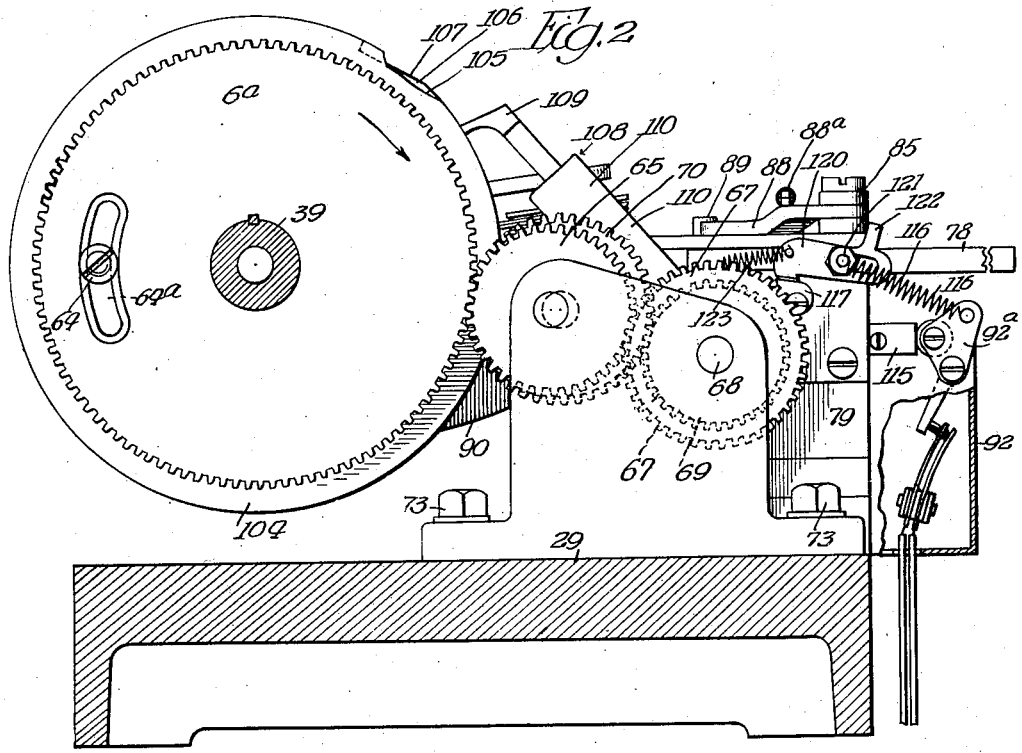
Fig. 2 is a vertical section on line 2—2 of Fig. 1.

Cam 53 is rotated in the same direction as, and at a slightly slower speed than, the winding-arm 46 and its drive-shaft 39, by reduction gearing (Figs. 1 and 2) comprising a gear 64 which is keyed to shaft 39; a pinion 65 mounted on a stud 66, and meshing with gear 64; a gear 67 rotating on a stud 68 and meshing with pinion 65; a pinion 69 fixed to rotate with gear 67, a gear 70 rotatable on stud 66 and meshing with pinion 69; and a gear 71 meshing with gear 70 and fixed to cam 53. This gearing drives gear 71 and cam 53 at a sufficiently lower speed than shaft 39 and winding-arm 46 to cause cam 53 to impart the successive longitudinal steps to the winding-arm for the completion of a coil. This gearing is adapted to rotate cam 53 to make one complete revolution relatively to winding-arm 46 during a complete coil-winding operation.

Gears 65, 67, 69, and 70 and the studs 66 and 68 are mounted in a removable bracket 72 which is adjustably secured by screws 73 to the bed 30 to permit different gear-sets to be readily substituted to vary the relative speed of the cam 53 with respect to the winding-arm 46 when coils of different numbers of convolutions are to be formed. For this purpose, cams 53 of different shapes may be substituted to meet these requirements in winding different coils.

The coils are usually wound with a pair of parallel wires $a$. Mechanism is provided for shearing the ends of the wires $a$ of each coil upon completion of a winding operation and for bending a hook $a'$ on the ends of the wires to secure them to the stationary head 74. Head 74 has a transverse slot 75 lined with a lower cutter-plate 76 and an upper cutter-plate 77 (Figs. 10-14). A reciprocable cutter-blade 78 is adapted to pass between said plates 76 and 77 and into slot 75 to shear the wire laid or held against said plates. At the beginning of a winding operation, the ends $a^2$ of parallel wires $a$ are bent over the lower plate 76 (Fig. 11) and hooked on the head 74 so they will be held against rotation while the winding-arm 46 winds the coil. During the winding operation the cutter-blade is retracted (Fig. 1) to permit said arm to travel around head 74. After a coil has been wound around the form 31, 37, and during the last revolution of arm 46 of each series of revolutions of each coil winding operation, said arm will be swung longitudinally into position shown in Fig. 9 as the roller 54 thereon enters the notch 53$^a$ in cam 53 to lay the wires over the inclined guide or horn 80 on head 74 and across the plates 76, 77 and slot 75. When the blade 78 is shifted into slot 75 it will sever the wires at the lower edge of upper plate 77 in the head and bend the portion of the wires between plate 76, 77 downwardly around the outer edge of lower plate 76 and over the top face of said plate (Fig. 10), the cutter-blade 78 being provided with a notch 82 for that purpose. The hooks will be formed on the ends $a^2$ of the wires which extend between the head 74 and the winding-arm 46 for the purpose of securing them to the head. When the wires are laid around the head 74 after a coil has been wound, the portions thereof extending across slot 75 will crowd the hooks on the other end of the coil laterally into position illustrated in Figs. 12 and 13. A notch 81 is cut in the front edge of the cutter-blade 78 which is in alignment with the hooked ends of the wires after they have been crowded laterally as aforesaid. As the cutter-blade 78 is operated to sever the ends of the completed coil, it will, at notch 81, also sever the hooks from the wires so that the completed coil will be separable from the head.

The cutter-blade 78 is shifted to shear the wire simultaneously with the opening of the form-sections 31, 37 for the removal of a completed coil, so it will pass into the slot 75 and lock the head 74 and form-section 37 against rotation while the form-section 31 is separated from section 37. For this purpose, the blade 78 is movable into its operative position by a link 83 (Figs. 9, 19) which is pivoted at 84 to a lug attached to the tail-stock 33 which is slidable in bracket 34, an arm 85 which is pivoted at 86 to the top of the bracket in which the cutter-blade 78 is mounted and to link 83 at 87, and a thrust arm 88 which is pivoted to the outer end of arm 85 and has a recess in its outer end adapted to engage an upstanding stud 89 on the cutter-blade. Arm 88 is retractible by its shifting means independently of stud 89 so that cutter-blade 78 will not be retracted when the tail-stock 33 is shifted to bring the form-sections 31, 37 together preparatory to the succeeding winding operation so that the cutter blade 78 will continue to secure the head 74 against rotation until the form-sections 31 and 37 have been brought together for the succeeding winding operation and it is necessary to retract blade 78 to provide clearance for the rotation of the winding-arm 46. A spring 88$^a$ is applied between link 83 and arm 88 to normally hold a stop 88$^b$ (Fig. 9) against arm 85 so the recess in the outer end of arm 88 will be aligned with the stud 89 when said arm is retracted independently of the cutter-blade 78. A cam 90 fixed to and rotating in advance of the winding-arm 46 engages an extension 78$^a$ on the cutter-blade 78 and retracts the blade during the first revolution of the winding-arm 46. This occurs in advance of the winding-arm to clear its path for winding the wires on the form.

Mechanism is provided for automatically stopping the winding-arm when the desired number of windings have been wound around the form 31, 37 to complete the coil and before the cutter-blade 78 is operated to sever the coil from the supply-line of wire. This mechanism comprises an electric switch 92 (Fig. 3) for controlling the electrical circuit for the magnet 63 which controls the operation of the fluid-motor 56 which drives the winding mechanism and positively acting stop mechanism whereby the shaft 39 and the winding-arm 46 will be arrested at a predetermined point after the desired number of windings for a complete coil have been wound on the form and the arm 46 has laid the wires into position on the head 74 in readiness for cutting.

Figure 3:
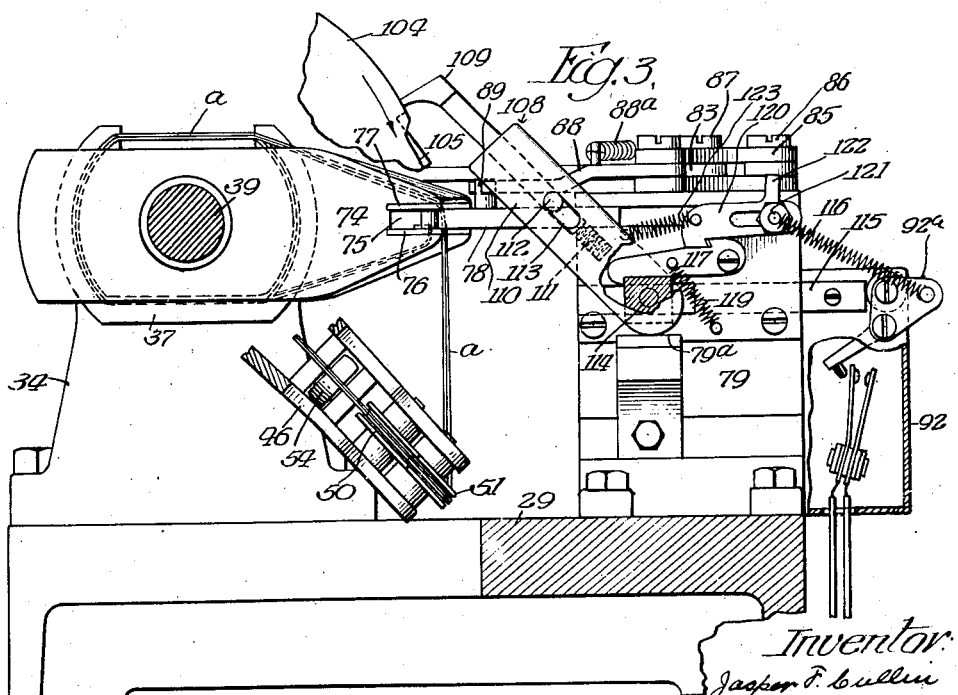
Fig. 3 is a vertical section on line 3—3 of Fig. 1, the cutting-blade being shown in its operative position and the winding mechanism being stopped.

The mechanism for controlling the motor 56 which automatically opens switch 92 to stop the winding mechanism at the end of a complete coil-winding operation, comprises a disk 104 which is fixed to rotate with gear 64 which is driven directly by the drive shaft 39 and is provided with a peripheral notch 105; an annular flange 106 having a peripheral notch 107 and fixed on cam 53; and an arm 108 which is pivotally and slidably supported to shift and control the switch 92. The notch 107 in flange 106 which makes one complete revolution relatively to the disk 104 and its cam notch 105 during each complete winding operation is adapted to shift arm 108 to open switch 92 when notches 105 in disk 104 and notch 107 in flange 106 are side-by-side and permit the distal end of the dog to swing into both notches. For accurate timing the disk 104 is adjustably secured to gear 64 by a screw (Figs. 1 and 2) which extends through an arcuate slot 64$^a$ in said gear. The rear end of notch 107 has a radial shoulder which engages arm 108 to shift it bodily to effect the opening of switch 92. The notch 105 in disk 104 which travels faster than the flange 106 and its notch 107 is inclined to lift the arm 108 out of the notch 107 when arm 108 has opened switch 92. Arm 108 comprises a dog 109 adapted to ride on the peripheries of disk 104 and flange 106 and a body 110 in which a stem on the dog 109 is slidably mounted. A cushion-spring 111 presses dog 109 outwardly within the limits of a stop-pin 112 which is fixed to the stem of dog 109 and is slidable in a slot 113 formed in the body 110. The body 110 of arm 108 is pivoted on a stud 114 which is rigid with a bar 115 which is slidably mounted in bracket 79 in which the cutter-blade 78 is mounted. The outer end of bar 115 is adapted to engage a roller on an arm 92$^a$ on the rock-shaft of the arm of switch 92. A spring 116 is applied to switch arm 92$^a$ to normally hold switch 92 in its closed position. The lower end of the body 110 of arm 108 slides on a fixed track 79ᵃ to avoid the application of twisting stresses from arm 108 on bar 115. A latch 117 which is pivoted to one side of bracket 79, is adapted to engage the square stud 114 on slide-bar 115 to hold said bar and the lower pivoted end of arm 108 in position to hold open the switch 92 upon the shift of said arm by the notch 107 in flange 106 upon the completion of a winding operation. A spring 119 is applied to latch 117 to snap it into position to lock stud 114 (Fig. 5) when the latter is moved outwardly by the arm 108. A trip-arm 120 is pivotally and slidably mounted on a stud 121 which is fixed to bracket 79 and passes through an elongated slot in said trip-arm and has a hook adapted to engage a shoulder on latch 117 to shift said latch to release stud 114, bar 115 and arm 108 so the switch 92 will be closed when the completed coil has been removed from form 31, 37 and the form-sections are brought together for the next winding operation. Trip-arm 120 is provided with an upstanding lug 122 which is engaged by the arm 85 of the mechanism for separating the form-sections and shifting the cutter-blade 78 into its operative position. A spring 123 is applied to normally shift trip-arm 120 longitudinally when the link 85 is shifted out of its normal position and at the same time to swing the link to engage latch 117 when the arm 85 is shifted to release the trip-arm (Fig. 3). At the completion of a winding operation, bar 115 is secured in position to hold switch 92 open by latch 117, as shown in Fig. 5. When the tail-stock 33 is retracted to separate the form-sections 31, 37, which is done after the arm 108 has been shifted to open switch 92 and latch 117 holds said bar, arm 85 of the connection for shifting the cutter-blade 78 will be moved away from lug 122 of the trip-arm 120, whereupon spring 123 will shift the trip-arm into position shown in Fig. 3. When the tail-stock 33 is shifted to bring the form-sections 31, 37 together, arm 85 will engage lug 122 and shift the trip-arm 120 into position shown in Fig. 4. This movement of the trip-arm will first rock latch 117 to release the stud 114 on the slide-bar 115 and then rock the trip-arm to release said latch into the position shown in Fig. 4. During the following winding operation, trip-arm 120 will remain in position shown in Fig. 4, so that it will be inoperative until arm 85 is next operated to open the form 31, 37 and shift the cutter-blade 78 into its operative position. During the winding operation, latch 117 will rest on top of stud 114 until arm 108 is shifted by the flange 106 on cam 53 to open the switch at the end of a winding operation.

The positively-acting stop mechanism for arresting the winding-arm at the desired predetermined point in its rotation at the end of a winding operation comprises (Figs. 17 and 18) a disk 94 fixed to rotate with shaft 39; a stop-dog 95 adapted to engage a shoulder 96 on said disk and pivoted at 97 to the bed 29; and a rod which is pivoted to and shiftable by the magnet-controlled lever 61 and extends through a lug on dog 95 and has an adjustable collar at its upper end for engaging said lug to hold the dog disengaged from said disk against the force of a spring 100. A spring-pressed pawl 101 is pivoted at 102 and engages a shoulder 103 on disk 94 to prevent backlash of shaft 39 and the winding-arm 46. When the helix of magnet 63 is energized, which occurs when switch 92 is closed and the winding mechanism is in operation, it will hold dog 95 disengaged from disk 94. When switch 92 is opened by the automatically-controlled stop-mechanism, magnet 63 will be deenergized, whereupon dog 95 will be pressed by spring 100 against disk 94 to engage shoulder 96 and positively stop shaft 39 and winding-arm 46 against further rotation. This mechanism causes the winding-arm to be positively stopped at the correct starting position for each winding operation.

The invention provides means for grasping each completed coil, after it has been wound on the form 31, 37 with the ends of wire projecting therefrom, to hold its loops together and facilitate the handling of the coil until its assembly with the armature-core. This means consists of clips (Figs. 15, 16, 21, 22, and 23) which are provided in any desired number and are adapted to be placed on the top of form-sections and slipped around the windings of the coil thereon, before the sections are separated for the removal of the coil. Each of these clips is built up of a pair of plates 125, 126 which are spaced apart along one side by an intermediate strip 127, and all rigidly secured together in any suitable manner, and ejector-bar 132 confined between said plates. A pair of flat spring-strips 128 have terminals fixedly secured to the upper face of plate 126 and extend freely around the back and underside of the clip so their underlying portions will be resilient. These strips are each provided at their front ends with an upturned tongue 129 adapted to extend across the gap between plates 125, 126, for securing the coil between said plates and with an inclined or cam-portion 130 which extends through a slot in the lower plate 125 for engagement by a wedge-surface 131 of the ejector-bar 132 which is slidably confined between plates 125 and 126. The clip fits flatwise on the inclined top face of head 32 and form-section 31 so it will be guided into position to receive the coil on the form. Lugs 134 on the plates of the clip fit between shoulders 135 on form-section 31 and head 32, to guide the clip into position to receive the coil within the opening between the plates 125, 126 (Figs. 15 and 23). Ejector 132 has projecting ends which are adapted to engage stops 136 on the form-section 31 as the clip is slipped over form-section 31 to arrest said plate and permit the plates 125 and 126 to pass over and under the windings of the coil. When a previously formed coil has been ejected from the clip, the ejector will be positioned at the front of the clip, as shown in Fig. 21, in which position it will hold the spring-strips 128 depressed so their tongues 129 will be positioned for the reception of the coil. The clip is first placed on head 32 and section 31, as shown in Fig. 21, adjacent the wound coil and while the form-sections are closed or together. The ejector 132 will then be arrested by stops 136. The plates 125, 126 and strip 127 will then be forced toward the end form-section 37 while the ejector 132 is arrested by stops 136, so the windings on the form will pass between plates 125, 126 until the entire coil lies within the space between said plates, as shown in Fig. 22. The wedge-surfaces 131 on the ejector 132 will then permit the strips 128 to snap inwardly and tongues 129 pass across the gap between plates 125, 126 and retain the coil in the clip. The upper face of head 32 and form-section 31 have grooves cut therein to receive spring-strips 128 while the clip is being moved into receiving position. These clips are utilized to firmly retain the convolutions of the coil in proper relation for removal to the machine or apparatus for assembling the coils in armature cores. The ejectors may be utilized to force the coil from the clip into the grooves of the armatures during the assembling operation.

Figure 7:
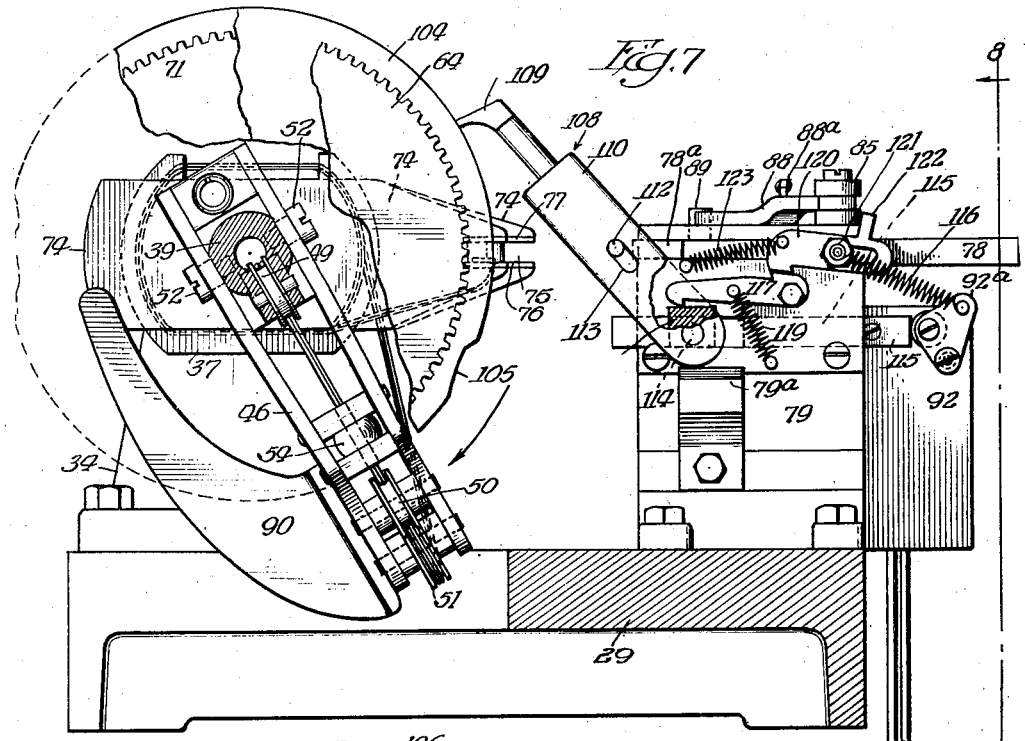
Fig. 7 is a transverse section illustrating the winding-arm and the controlling mechanism for said arm during a winding operation.
Figure 8:
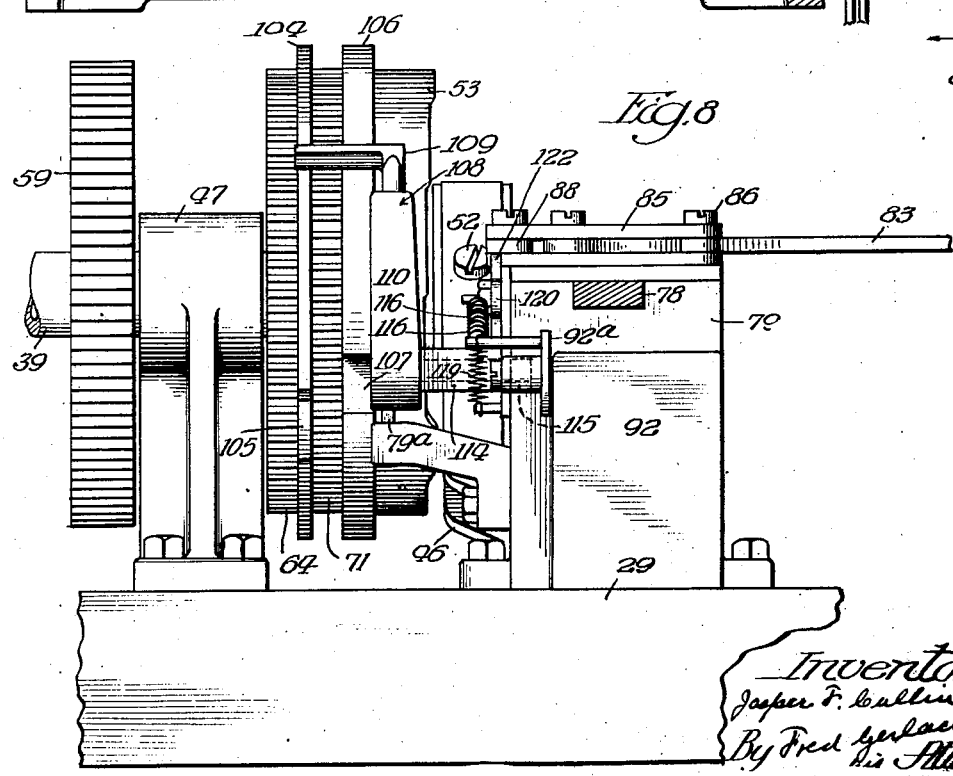
Fig. 8 is a rear elevation of the wire-shearing mechanism, the switch controlling devices for controlling the operation of the winding mechanism and parts of the gearing for driving the winding mechanism.

The operation of the winding and controlling mechanisms will be as follows: At the commencement of a winding operation, the sections 31, 37 of the form will be separated, as shown in Fig. 9 and by dotted lines in Fig. 20, as they are left after the removal of the previously wound coil. While the form-sections are separated, the mechanism for shifting the cutter-blade 78, including links 83, and arms 85 and 88, will be in position shown in Fig. 9 with the cutter-blade 78 in the head 74. At such time arm 85 of the connection for shifting the cutter-blade 78, will be away from trip-arm 120, and said trip-arm, latch 117, slide bar 115 and arm 108 will be in position shown in Fig. 3 and switch-lever 92ᵃ will be held to hold the switch 92 open. Disk 104 and flange 106 will then be in position shown in Fig. 3, magnet 63 will be deenergized, throttle 60 will be closed and motor 56 will be inoperative. The operator will first close the form by shifting form-section 31 into mating engagement with form-section 37, as shown in Figs. 19 and 20. As the form is closed, link 83 and arms 85, 88 will be shifted into position shown in Fig. 1, independently of cutter-head 74, and arm 85 will strike trip-arm 120 and shift it into position shown in Fig. 7. The trip-arm 120 will rock latch 117 to release stud 114 and permit spring 116, which is applied to switch-lever 92ᵃ, to shift the slide-bar 115, stud 114, and the lower end of arm 108. This movement of bar 115 will close switch 92 to energize magnet 63 which will operate lever 61 to open the throttle-valve 60, to admit fluid to, and drive the motor 56 which drives the shaft 39 of the winding mechanism.

During the initial revolution of the winding-arm 46 and in advance thereof, cam 90, which rotates with the winding-arm, will engage the cutter-blade 78 and retract it to clear the path of rotation of the winding-arm. During the initial revolution of each winding operation, arm 46 will be shifted by cam 53 from the position shown in Fig. 9 to that shown in Fig. 1, so that the wires a from said arm will clear head 74 and will be wound on the form. The parallel wires a will be held by their hooked ends a' in engagement with the stationary cutter-head 74 so the rotation of the winding-arm around the form will wind the coil. During the operation, the winding-arm will traverse the form axially and back and forth to evenly wind the layers of wire on the form under control of cam 53.

The winding-arm will continue to be rotated until cam 53 has completed one revolution relatively to the winding-arm. While this occurs, the desired number of revolutions of wire will be wound on the form. During the last revolution of the winding-arm of the series required for a complete coil, the arm will be swung longitudinally by spring 55 under control of notch 53ᵃ in cam 53 to lap the wires a around the horn or guide 80 on the cutter-head and across the slot 75 in said head 74 and the cutting-edges of plates 77, 76 (Figs. 12 and 13). During the winding operation, dog 109 will ride on the peripheries of disk 104 and flange 106, and will not be actuated to shift bar 115, so that switch 92 will remain closed to continue the operation of motor 56. After the coil has been wound and the wires a have been lapped around the cutter-head 74, disk 104 and flange 106, on account of their relative rotation, produced by the gears 64, 65, 67, 69, 70 and 71, will bring their respective notches 105 and 107 into registry so that the dog 109 of arm 108 can drop into both notches by pivotal movement on stud 114. The shoulder at the end of notch 107 will then engage the dog 109 and shift arm 108 longitudinally to move the stud 114 on the bar 115 outwardly. This will cause bar 115 to rock switch-lever 92ᵃ against the force of spring 116 and open the switch 92. Latch 117 will then swing into position shown in Figs. 3 and 5 to lock stud 114 and bar 115 to hold the switch 92 open. While dog 109 of arm 108 is being shifted longitudinally by the shoulder of notch 107 in flange 106, the inclined trailing end of notch 105 in disk 104 which rotates faster than, and relatively to, the notch 107 in flange 106, will lift dog 109 over the shoulder of notch 107 and swing the dog on the pivot of arm 108, so the dog will rest on the peripheries of both the disk and the flange in readiness for the succeeding winding operation. During the winding operation, notches 105 and 107 are out of alignment so that the dog 109 will not swing into notch 107 until the notches 105, 107, are both positioned to permit the dog 109 to swing into notch 107. Spring 111 cushions the impact of the shoulder of notch 107 against dog 109. When the disk 94 on winding-shaft 39 reaches the position shown in Fig. 17, which it may do by momentum after the switch 92 has been opened, dog 95 and backlash pawl 101 will lock the said shaft and the winding-arm 46 against rotation. The operator will then retract the form-section 31, which will operate link 83 and arms 83, 85 and 88 to project the cutter-blade 78 into the slot 75 between plates 76, 77 in head 74 (Fig. 9). Latch 117, as soon as the bar 115 has been thus shifted will secure stud 114 and slide-bar 115 in position to hold the switch open, as shown in Fig. 5.

The operator will, while the winding mechanism is stopped, apply one of the clips to the coil wound on the form as previously described. Next, the operator will retract the tail-stock 33 to separate the form-sections 31, 37 and simultaneously shift the cutter-blade 78 into the cutter-head 74 so that the latter and form-section 37 will be held against rotation while the form-sections are separated. This movement of cutter-blade 78 will shear the hooked ends a' of the wires a which are held in the head and also shear, at the upper plate 77, the ends of the wires which then extend across the slot 75 between said plates at, and bend the sheared portions on, the beginning of the new coil to form hooks a' which will secure wires of the next coil to be wound in the head during the succeeding winding operation. The wires a, where they are laid across slot 75, will crowd the previously formed hooked ends a' into alignment with the portion of the cutter-blade 78 (Fig. 12) into notch 81.

When the cutter-blade 78 is shifted to shear the wires a, as aforesaid, arm 85 of the connection for shifting said blade, will release trip-arm 120 and permit spring 123 to shift the trip-arm into position shown in Fig. 3. When the form 31, 37 is next closed, arm 85 strikes trip-arm 120 which is then engaging latch 117, and swings the latch so it will release stud 114 and bar 115. This will cause the switch 92 to be closed and the trip-arm 120, latch 117, arm 108 and bar 115 to pass into position shown in Fig. 7. The closing of the switch 92 will energize magnet 63 to open the throttle valve 60 to operate motor 56 and to release dog 95 and latch 101 for the next operation of the winding mechanism. During the first revolution of the winding arm 46, cam 90, which rotates with the winding-arm 46 and travels in advance thereof, will engage the cutter-blade 78 and force it outwardly to clear the path for the winding-arm 46. These winding operations will be repeated and each operation will be controlled as described.

The invention contemplates the operation of dereeling mechanism (Figs. 24, 25, and 26) to release the wires in accordance with the length required for winding the coils and to control said mechanism (Figs. 27 and 28) from the winding mechanism. The dereeling mechanism comprises a pair of hollow shafts or sleeves 140 each for holding a reel 139 of wire. Sleeves 140 are fixedly supported in a frame or arms 141 which is fixed to a shaft 142. This frame and shaft are adapted to bodily rotate the sleeves 140 and the reels carried thereby. Shaft 142 is driven from an electric motor 144 through suitable reduction gearing 145, a pulley 146, belt 147 and a pulley 148 fixed to shaft 142. Disks 149, having curved peripheries, are removably secured to shafts 151 which extend through sleeve 140. These shafts are adapted to be driven around the axes of the reels 139, respectively, to unwind the wire from the reels. The disks 149 are driven during the bodily rotation of the reels and sleeves 140, by pulleys 152 fixed to shafts 151, respectively, and a friction-pulley 153 which engages both of the pulleys 152 and is fixedly held, and stationarily, on the journal at the upper end of standard 143. During the periods when the motor is operated, pulleys 152 will, through frictional engagement with the stationary friction-wheel 153, rotate the disks 149. The wires from the reels 139 are looped around the peripheries of the disks 149 and between the reels and guides 154 which are coaxial with the reels, respectively. From guides 154 the wires are guided by sheaves 155 and 156 to rollers 157 which guide the wires to a point substantially coaxial with the hollow-shaft 39 of the coil-winding mechanism. Guides 154, shaft 142 and sheaves 155, 156 are carried by a bracket 158 which is fixed to a sleeve 159 which is secured to rotate with the shaft 142. Rollers 157 are mounted on a bracket which is secured to sleeve 159. A bracket 160 is fixed to sleeve 159 and to a hollow stud 161 which is journaled in a bracket 162. The bodily rotation of the reels prevents the twisting of the wires by the winding mechanism so they will be fed in parallel to the winding-shaft. The rotation of the disks 149 on their own axes dereels the wire from the reels. While the winding arm 46 is rotating to wind the wire around the form for the coil, the wires are subjected to a pull to cause the leads from the reels to frictionally engage the periphery of the disks 149. When the winding-arm fails to take up the wire paid out by the disks 149, the loops of wire around the disk will be loose and free and the dereeling of the wire will stop.

Motor 144 which drives the dereeling mechanism is controlled by an electric switch 163 (Figs. 27 and 28) which is automatically controlled by the winding mechanism. The mechanism for controlling switch 163 and motor 144 comprises a pulley 164 which has a hollow hub which is fixed to rotate with the winding shaft 39; a belt 165 driven by said pulley; a pulley 166 driven by said belt and fixed to a shaft 167 which is journaled in a bracket 168; a sleeve 169 (Fig. 28) secured to rotate with and slidable on shaft 167 by means of a pin 170 fixed to said shaft and extending into a slot 171 in the sleeve; a collar 172 carried by sleeve 169 to coact with an annular shoulder on the sleeve in shifting the lever 173 of switch 163; a shaft 174 mounted in a bearing suspended from table 30 coaxial with sleeve 169, and provided with a screw-thread 175 engaging an internal screw-thread in the sleeve 169 to cause the sleeve to be shifted to switch lever 173 by relative rotation of shafts 174 and 167; and operated in synchronism with the bodily rotation of the reels 139 by a pulley 176 fixed to said shaft, a belt 177 around said pulley and a pulley 178 on the hollow stud 161 which is rotated from shaft 142 by sleeve 159 and bracket 160.

The operation of this mechanism for controlling the dereeling mechanism will be as follows: When the winding mechanism is started as the result of the closing of switch 92, pulley 164 which rotates with the winding shaft, will drive belt 165, pulley 166, shaft 167 and sleeve 169, at which time the shaft 174 will be idle. The sleeve 169, through its screw-thread engagement with stationary shaft 174, will shift switch-lever 173 and close switch 163 to start the motor 144 for driving the dereeling mechanism with the winding-shaft 39. Motor 144 is wound to drive shaft 142 at the same speed as the winding-shaft 39 is driven. When the motor 144 is started, shafts 167 and 174 will be driven at the same speed so that the axial movement of sleeve 169 will be discontinued and the switch 163 will remain closed to continue the operation of motor 144. When the winding mechanism is automatically stopped by the opening of switch 92, as hereinbefore described, at the completion of a coil-winding operation, shaft 167 will also stop. Thereupon, sleeve 169 will be held against rotation while shaft 174, through its screw-thread connection with the sleeve, will shift the latter axially to open the switch. As a result, the dereeling mechanism will be operated and automatically controlled responsively to the operations of the winding mechanism.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a machine for winding wire coils, the combination of a non-rotatable form around which the wire is wound, formed of separable sections; a stationary head; a rotatable winding-arm adapted to lay the wire around the form and the head, the head being disposed between the arm and the form; means for supplying wire to the arm; and means for driving said arm.

2. In a machine for making wire coils for armatures, the combination of a stationary form for the wire composed of separable sections to permit the coil to be removed; a rotatable winding-arm coaxial with, and for laying the wire around the form; a stationary head between the form and the arm, the arm being adapted to rotate around the head and being longitudinally movable to lay the end of a coil on the head; means for supplying wire to the arm; and means for driving the arm.

3. In a machine for winding wire coils, the combination of a non-rotatable form around which the wire is wound; a stationary head adjacent said form; a rotatable and longitudinally swinging winding-arm adapted to lay the wire around the form and the head; means for automatically controlling the swinging movement of the arm; and means for shearing the wire when it is lapped around the head.

4. In a machine for winding wire coils, the combination of a non-rotatable form around which the wire is wound; a stationary head adjacent said form; a rotatable winding-arm adapted to lay the wire around the form and the head; means for guiding wire to the arm; and means for conjointly shearing the wire lapped around the head and for securing one end of the wire to the head.

5. In a machine for winding wire coils, the combination of a non-rotatable form composed of separable sections around which the wire is wound; a stationary head to one side of which one of the form-sections is fixed; a rotatable winding-arm adapted to lay the wire around the form and movable longitudinally to lay the wire across the head when a coil is wound; and means for shearing the wire lapped around the head.

6. In a winding machine for wire coils, the combination of a stationary form for the wire; a stationary head adjacent said form; a rotatable winding-arm for laying the wire around the form and the head; means for supplying wire to the arm; and means for shearing the wire lapping the head, comprising a cutter-blade movably mounted independently of and coacting with the head.

7. In a winding machine for wire coils, the combination of a stationary form for the wire; a stationary head adjacent said form; a rotatable winding-arm for laying the wire around the form and the head; means for supplying wire to the arm; and means for shearing the wire lapped around the head, comprising a cutter-blade movably mounted independently of the head; and a plurality of coacting blades in the head.

8. In a winding machine for wire coils, the combination of a stationary form for the wire; a stationary head adjacent said form; a rotatable winding-arm for laying the wire around the form and the head; means for supplying wire to the arm; means for shearing the wire lapped around the head, comprising a cutter-blade movably mounted independently of the head; and a coacting blade in the head, the blade having means for bending a hook on the wire to secure it to the head.

9. In a winding machine for wire coils, the combination of a stationary form; a stationary head adjacent said form; a rotatable winding-arm for laying the wire around the form and the head; means for supplying wire to the arm; a drive-shaft for said arm, said head being non-rotatably supported by said shaft; means on the form for securing the head against rotation; and means mounted independently of the head and movable into interfitting engagement therewith to secure it against rotation.

10. In a winding machine for wire coils, the combination of a stationary form formed of separable sections; a stationary head adjacent said form; a rotatable winding-arm for laying the wire around the form and the head; means for supplying wire to the arm; a drive-shaft for said arm, said head and one of the form-sections being non-rotatably supported by said shaft; means for shifting the other form-section to open and close the form; means on the latter form-section for holding the head against rotation when the form is closed; and means mounted independently of the head and movable into interfitting engagement therewith to secure it against rotation when the form-sections are separated.

11. In a winding machine for wire coils, the combination of a stationary form formed of separable sections; a stationary head adjacent said form; a rotatable winding-arm for laying the wire around the form and the head; means for supplying wire to the arm; a drive-shaft for said arm, said head and one of the form-sections being non-rotatably supported by said shaft; means for shifting the other form-section to open and close the form, said head being secured against rotation by the last named form-section; and a shearing member mounted independently of the head and movable into engagement with the head to secure the head against rotation when the form-sections are separable to remove a coil.

12. In a winding machine for wire coils, the combination of a stationary form formed of separable sections; a stationary head adjacent said form; a rotatable winding-arm for laying the wire around the form and the head; means for supplying wire to the arm; a drive-shaft for said arm, said head and one of the form-sections being non-rotatably carried by said shaft, said head being secured against rotation by the other form-section; a shearing member mounted independently of the head and movable into engagement with the head to secure the head against rotation when the form-sections are separated to remove a coil; and means for conjointly shifting said other form-section to open the form and said shearing member to shear the wire.

13. In a winding machine for wire coils, the combination of a stationary form formed of separable sections; a stationary head adjacent said form; a rotatable winding-arm for laying the wire around the form and the head; means for supplying wire to the arm; a drive-shaft for said arm, said head and one of the form-sections being non-rotatably carried by said shaft, said head being secured against rotation by the other form-section; a shearing member mounted independently of the head and movable into engagement with the head to secure the head against rotation when the form-sections are separated to remove a coil; and means for conjointly shifting said other form-section to open the form and said shearing member to shear the wire, said shifting means being adapted to close the form without retracting the shearing member from the head.

14. In a winding machine for wire coils, the combination of a stationary form around which the wire is wound; a longitudinally moving winding-arm adapted to rotate around and lay the wire on the form; a shaft for driving said arm; means for guiding wire through the shaft and to the arm; a rotatable cam on the shaft for controlling the longitudinal movement of the arm; and means for rotating said cam relatively to the arm, comprising gears respectively fixed to the shaft and the cam, and a gear-train between said gears.

15. In a winding machine for wire coils, the combination of a stationary form around which the wire is wound; a longitudinally moving winding-arm adapted to rotate around and lay the wire on the form; a shaft for driving said arm; means for guiding wire through the shaft and to the arm; a rotatable cam on the shaft for controlling the longitudinal movement of the arm; and means for rotating said cam relatively to the arm, comprising gears respectively fixed to the shaft and the cam, and an interchangeable gear-train between said gears.

16. In a winding machine for wire coils, the combination of a stationary form for the wire; a longitudinally moving winding-arm adapted to rotate around and lay the wire on the form; a shaft for driving said arm; means for guiding wire through the shaft and to the arm; a rotatable cam on the shaft for controlling the longitudinal movement of the arm; means for rotating said cam relatively to the arm, and means for automatically stopping said arm at the completion of a predetermined number of revolutions.

17. In a machine for winding wire coils, the combination of a stationary form around which the wire is wound and comprising separable sections; a rotatable winding-arm adapted to lay the wire around the form; means for shearing the wire leading to the winding-arm after a coil has been wound on the form; mechanism for driving the winding-arm; means for automatically stopping the driving means when a predetermined number of convolutions of wire have been wound on the form; and means for conjointly starting the driving mechanism and bringing the form-sections together.

18. In a machine for winding wire coils, the combination of a stationary form, a rotatable winding-arm adapted to lay the wire around the form; power-operated mechanism for driving the winding-arm; and means for automatically stopping the power means at the end of a predetermined number of revolutions of the winding-arm, comprising a pair of coaxial rotatable members driven by said power means and provided with coacting devices adapted to stop the driving mechanism when they come into rotative registration.

19. In a machine for winding wire coils, the combination of a stationary form, a rotatable winding-arm adapted to lay the wire around the form; power-operated mechanism for driving the winding-arm; and means for automatically stopping the power means at the end of a predetermined number of revolutions of the winding-arm, comprising a switch for controlling the power mechanism and a pair of coaxial rotatable members driven by said mechanism and provided with coacting devices adapted to shift the switch to stop the driving mechanism when they come into rotative registration.

20. In a winding machine for wire coils, the combination of a stationary form around which the wires are wound; a rotatable winding-arm for laying the wire around the form; a shaft for driving said arm; a plurality of reels of wire for supplying the wire to the arm; means for guiding a plurality of wires through the shaft to said arm; means for bodily rotating the reels; and means for controlling the spool-rotating means conjointly with the operation of the winding-arm.

21. In a winding machine for wire coils, the combination of a stationary form around which the wires are wound; a rotatable winding-arm for laying the wire around the form; a shaft for driving said arm; a plurality of reels of wire for supplying the wire to the arm; means for guiding a plurality of wires through the shaft to said arm; means for bodily rotating the reels coaxially with the winding-arm; and means for controlling the spool-rotating means conjointly with the operation of the winding-arm.

22. A clip for use with a machine for winding coils on a form, comprising means adapted to be placed around the windings at one side of a coil on the form, and means for removably retaining the windings in the clip upon removal of the coil from the form.

23. A clip for use with a machine for winding coils on a form having a recess therein, comprising means adapted to enter the recess and to be placed around the windings at one side of a coil on the form, and means for removably retaining the windings in the clip upon removal of the coil from the form.

24. A clip for use with a machine for winding coils on a form comprising means adapted to be placed around one side of a coil on the form, means for removably holding the coil in the clip, and means for ejecting the coil from the clip.

25. A clip for use with a machine for winding coils on a form comprising means adapted to be placed around the windings at one side of a coil on the form, means for ejecting the coil from the clip, and latch-means for removably holding the coil in the clip, releasable by the ejecting means.

26. A clip for use with a machine for winding coils on a form having a recess therein in which the clip is slidable, comprising a clip adapted to slide in the recess and to pass around the windings at one side of and into a coil on the form, and means for removably retaining the windings in the clip upon removal of the coil from the form.

JASPER F. CULLIN.